United States Patent [19]

Umemoto et al.

[11] Patent Number: 5,284,702
[45] Date of Patent: Feb. 8, 1994

[54] LOW FUMING PHENOLIC RESIN PREPREG AND PROCESS FOR PRODUCING THE SAME

[75] Inventors: Yoshitaka Umemoto; Takayuki Tanaka; Yasuo Furukawa, all of Shizuoka, Japan

[73] Assignee: Toho Rayon Co., Ltd., Tokyo, Japan

[21] Appl. No.: 745,302

[22] Filed: Aug. 15, 1991

[30] Foreign Application Priority Data

Aug. 17, 1990 [JP] Japan .................... 2-216723

[51] Int. Cl.$^5$ .................... B32B 7/00; B32B 27/00; B32B 17/02
[52] U.S. Cl. .................... 428/272; 428/273; 428/290; 528/87; 528/93
[58] Field of Search .................... 528/87, 93; 428/272, 428/273, 290

[56] References Cited

U.S. PATENT DOCUMENTS

| | | | |
|---|---|---|---|
| 2,779,668 | 1/1957 | Daniels et al. | 528/87 |
| 3,259,518 | 7/1966 | Sterman et al. | 428/252 |
| 4,131,582 | 12/1978 | Kako et al. | 260/29.3 |
| 4,264,671 | 4/1981 | Gillern et al. | 428/302 |
| 4,868,059 | 9/1989 | Walker et al. | 428/416 |
| 5,057,557 | 10/1991 | Treybig et al. | 523/404 |
| 5,066,735 | 11/1991 | Walker et al. | 525/482 |

FOREIGN PATENT DOCUMENTS

| | | |
|---|---|---|
| 467968 | 6/1973 | Australia . |
| 0166275 | 1/1986 | European Pat. Off. . |
| 878034 | 9/1961 | United Kingdom . |

OTHER PUBLICATIONS

Derwent Abstract of JP-A-2 132 128 Kanebo K.K.
Derwent Abstract of JP-A-2 187 448 Showa High Polymer K.K.
Derwent Abstract of JP-A-49 023 809 Mitsubishi-Edogawa Chem.

*Primary Examiner*—George F. Lesmes
*Assistant Examiner*—Chris Raimund
*Attorney, Agent, or Firm*—Sughrue, Mion, Zinn, Macpeak & Seas

[57] ABSTRACT

A low fuming phenolic resin prepreg comprising a fibrous base impregnated with 20 to 60% by weight of a resin composition comprising (a) 100 parts by weight of a resol phenolic resin, (b) from 1.5 to 15 parts by weight of polyacrylamide, (c) from 1.5 to 25 parts by weight of an epoxy resin, and (d) from 1.5 to 15 parts by weight of an inorganic filler, and the method for preparing the prepreg by impregnating a solution of (a), (b) and (c) having dispersed therein the filler into a fibrous base. The method for the prepreg comprising impregnating the fibrous base with the resin composition. The phenolic resin prepreg has low fuming properties as well as excellent self-adhesion.

20 Claims, 1 Drawing Sheet

LOW FUMING PHENOLIC RESIN PREPREG AND PROCESS FOR PRODUCING THE SAME

FIELD OF THE INVENTION

This invention relates to a low fuming thermosetting phenolic resin prepreg having excellent self-adhesion and a process for producing the same. More particularly, it relates to a self-adhesive thermosetting phenolic resin prepreg which has burning retardance and low fuming characteristics on burning and is therefore suitable for the production of structural materials, particularly interior parts of aircraft, vehicles, marine structures and architectural structures and to a process for producing the same.

BACKGROUND OF THE INVENTION

Honeycomb sandwich panels are widely used as structural materials in aircraft, sports goods, marine structures, vehicles, and the like because of their lightness and rigidity. In particular, panels for aircraft interior parts are produced by impregnating a reinforcing fibrous base with an epoxy matrix resin to prepare prepregs, laminating the prepregs on a honeycomb core, and heating the laminate under pressure.

Regulations providing fuming properties of aircraft interior parts have recently been laid down and enforced by the Federal Aviation Administration, U.S.A. (F.A.A.) from the standpoint of safety assurance for passengers in the case of fire, and structural materials having low fuming characteristics on burning have been required.

Phenolic resins are essentially flame retardant and low fuming. However, when used as a surfacing material of honeycomb sandwich panels, phenolic resins are very brittle and poor in self-adhesion.

SUMMARY OF THE INVENTION

An object of the present invention is to provide a thermosetting phenolic resin prepreg having low fuming properties as well as excellent self-adhesion.

Another object of the present invention is to provide a process for producing such a phenolic resin prepreg.

The above objects of the present invention are accomplished by a low fuming phenolic resin prepreg comprising a fibrous base impregnated with 20 to 60% by weight of a resin composition comprising (a) 100 parts by weight of a resol phenolic resin, (b) from 1.5 to 15 parts by weight of polyacrylamide, (c) from 1.5 to 25 parts by weight of an epoxy resin, and (d) from 1.5 to 15 parts by weight of an inorganic filler. (The amounts are solid basis) The percentage of the resin which is impregnated is based on the total weight of the fibrous base and solid components of (a) to (d).

The prepreg of the present invention can be produced by a process comprising mixing (a) 100 parts by weight of a resol phenolic resin, (b) from 1.5 to 15 parts by weight of polyacrylamide, (c) from 1.5 to 25 parts by weight of an epoxy resin, and (d) from 1.5 to 15 parts by weight of an inorganic filler to prepare a dispersion containing the solids content of from 30 to 85% by weight in a liquid diluent, and impregnating the resin composition into a fibrous base in an amount of from 20 to 60% by weight of the resin composition, and drying the impregnated fibrous base.

DETAILED DESCRIPTION OF THE INVENTION

Figure 1:
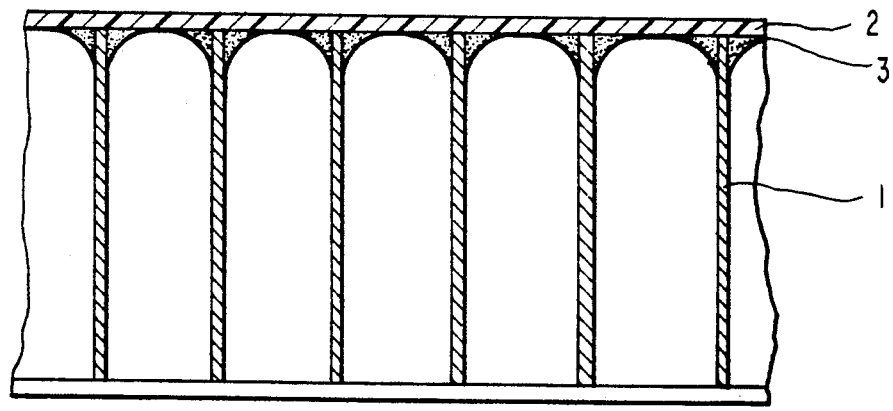
FIG. 1 shows "fillet" formed on a honeycomb sandwich panel.

The resol phenolic resin as component (a) is preferably water-soluble or capable of forming an emulsion by dissolving a water-insoluble resol phenolic resin in an organic solvent and dispersing the organic solution to water. Usually, an organic solution containing from 40 to 80 wt % of a resol phenolic resin is dispersed into water to obtain an emulsion of from 40 to 60 wt % solid content. A particularly preferred resol phenolic resin is a water-soluble resol phenolic resin. The water-soluble resol phenolic resin is preferably used as a 40 to 60 wt % aqueous solution.

In the present invention, the resol phenolic resin represented by the following formula is preferably used:

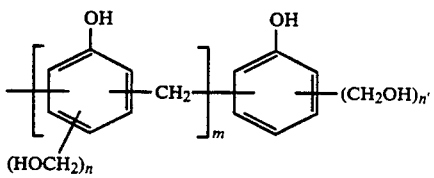

usually a mixture of compounds where $m \geq 0$ and $n$ and $n'$ each is 0 to 5 in the formula is used. The resol phenolic resin usually has a number average molecular weight ($\overline{M}n$) of about 200 to 300.

A water soluble resol phenolic resin can be obtained by conducting a condensation reaction of phenol and formaldehyde using an alkali catalyst, while a water-insoluble, organic solvent-soluble resol phenolic resin can be obtained by conducting the condensation reaction using an ammonia catalyst. Production of such resins are disclosed in U.S. Pat. Nos. 2,814,607, 2,816,090 and 2,822,346 in detail.

The polyacrylamide as component (b) preferably has a molecular weight ($\overline{M}n$) of 300,000 or more and is water soluble. Component (b) serves to give good tenacity and increased adhesiveness to the phenolic resin. Polyacrylamides having a molecular weight ($\overline{M}n$) of 300,000 or more, preferably from about 400,000 to about 800,000 give excellent effects. The molecular weight is preferably not more than 1,000,000.

The amount of polyacrylamide (b) in the resin composition ranges from 1.5 to 15 parts by weight, preferably 3 to 10 parts by weight, and more preferably 3.5 to 7.5 parts by weight per 100 parts by weight of resol phenolic resin (a). If it is less than 1.5 parts, the above-mentioned effects cannot be sufficiently expected. If it exceeds 15 parts, the resulting prepreg does not sufficiently exhibits low fuming properties.

Methods for production of a polyacrylamide are disclosed, for example, in I. M. Kolthoff, et al., Analitica Chimica Acta., Vol 18, page 295, Amsterdam NLD, (1958).

The epoxy resin as component (c) is preferably water-soluble or of an emulsion type (i.e., water-insoluble, organic solvent-soluble, and the solution thereof can be dispersed into water to form an emulsion). Epoxy resin (c) is not particularly limited in the kind thereof, but usually it is selected from the following:

Bisphenol A Epoxy Resin

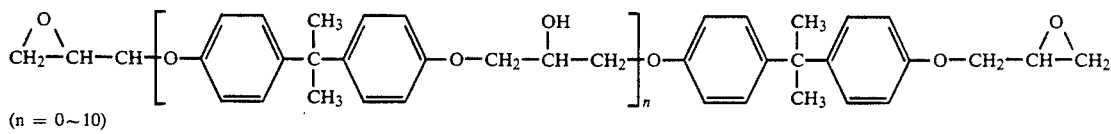

(n = 0~10)

Phenolnovolak Epoxy Resin

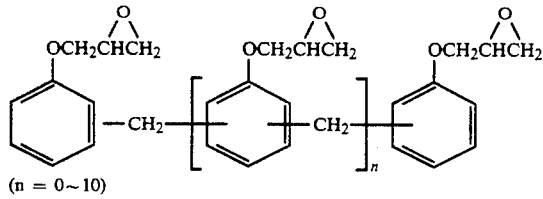

(n = 0~10)

Urethane Modified Epoxy Resin

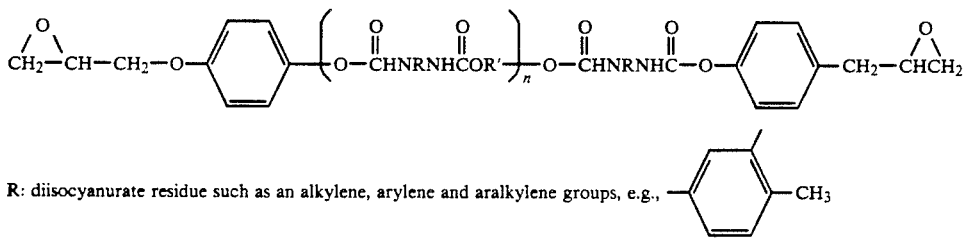

R: diisocyanurate residue such as an alkylene, arylene and aralkylene groups, e.g., R': alkylene group, e.g., $-(CH_2)_4-$ Alicyclic Epoxy Resin

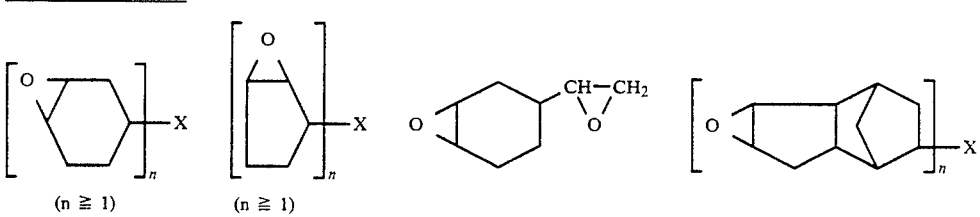

(n ≧ 1)   (n ≧ 1)

X: radical of an ester, ether, acetal, imide, amide or hydrocarbon

Long Chain Aliphatic Epoxy Resin

1. Bisphenol A Epoxy Resin

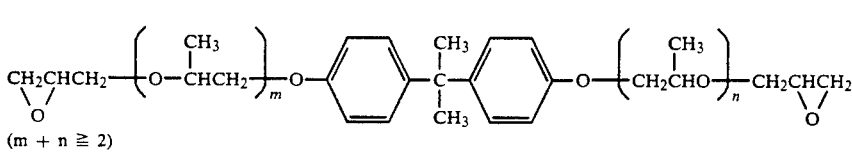

(m + n ≧ 2)

2. Dimer Acid Glycidyl Ester
3. Bis A Glycidyl Ether Dimer Acid Addition Product Brominated Bisphenol Epoxy Resin

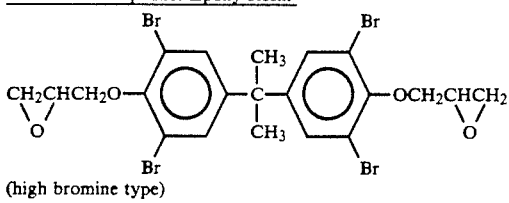

(high bromine type)

Hydantoin Epoxy Resin

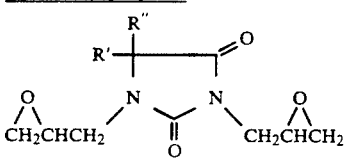

Wherein R' and R'' each represents an alkyl group having 1 to 5 carbon atoms.

-continued

Examples of combinations of R' and R" are $CH_3-$ and $CH_3-$, $CH_3-$ and $C_2H_5-$, $C_2H_5$ and $C_5H_{11}-$, etc.

Isocyanurate Heterocyclic Epoxy Resin

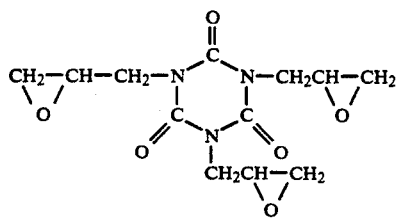

Epoxy resin (c) is preferably selected from a bisphenol A epoxy resin, a phenol novolak epoxy resin, and a urethane-modified epoxy resin of the emulsion type. Two or more epoxy resins may be used in combination.

In using a bisphenol A epoxy resin of the emulsion type as component (c), the alcoholic secondary hydroxyl group (as in Bisphenol A Epoxy Resin) provides strong adhesion effect and, in addition, a three-dimensional network structure is formed among the epoxy resin (c) and the resol phenolic resin (a) which functions as a curing agent to provide a cured product having enhanced tenacity. Such epoxy resins are commercially available.

The amount of epoxy resin (c) in the resin composition ranges from 1.5 to 25 parts by weight per 100 parts by weight of the resol phenolic resin. If it is less than 1.5 parts, marked adhesion effect cannot be obtained. If it exceeds 25 parts, low fuming properties cannot be sufficiently obtained, and self-extinguishing properties are impaired. A more preferred amount is from 2 to 20 parts by weight, and the most preferred amount is from 2.5 to 17.5 parts by weight.

The inorganic filler as component (d) is used to increase the viscosity of the composition, to lower internal stress and/or to inhibit contraction or shrinkage of the composition upon curing. Examples of the inorganic filler include powder of alumina, silica, titanium oxide, silicates (salt of Na, K, Ca or Al), calcium carbonate, and metals (e.g., alminum, copper and bronze).

The powder of the inorganic filler preferably has a mean diameter of from 1 to 200 nm. A mixture of fine silica powder ($SiO_2$) having an average particle diameter of from about 3 to 40 nm, preferably from about 7 to 16 nm, and aluminum oxide ultrafine powder ($Al_2O_3$) having an average particle diameter of from about 10 to 30 nm, preferably from about 15 to 25 nm, is especially suitably used in the present invention. In addition, a mixture of the above silica fine powder and titanium oxide ultrafine powder ($TiO_2$) having an average particle diameter of from about 10 to 30 nm, preferably from about 15 to 25 nm, is also useful.

These inorganic fillers are preferably treated with a silane coupling agent. The preferred silane coupling agent has the following formula:

$$YRSiX_3$$

wherein Y represents an organic group reactive with the matrix resin (i.e., with (a)+(b)+(c)), R represents an aliphatic hydrocarbon group, and X represents a hydrolyzable group such as —OR' or —COOR' (R': an aliphatic hydrocarbon group).

Examples of the organic group include $CH_2=CH-$, $CH_2=C(CH_3)COO-$,

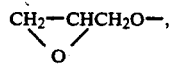

3,4,-epoxycyclohexyl, $NH_2C_2H_4NH-$ and $NH_2CONH-$. These groups react with a methylol group of component (a), an amido group of component (b) and/or an epoxy group of component (c).

Useful silane coupling agents include vinylsilane compounds (e.g., $CH_2=CHSi(OC_2H_5)_3$), methacrylsilane compounds

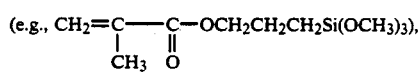

epoxysilane compounds

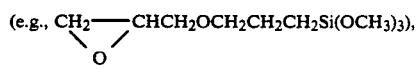

aminosilane compounds (e.g., $H_2NCH_2CH_2CH_2Si(OC_2H_5)_3$), chlorosilane compounds (e.g., $ClC_8H_6Si(OCH_3)_3$), and mercaptosilane compounds (e.g., $HSCH_2CH_2CH_2Si(OCH_3)_3$. Of these, epoxysilane compounds and aminosilane compounds are preferably employed.

The amount of the inorganic filler in the resin composition ranges from 1.5 to 15 parts by weight per 100 parts by weight of the resol phenolic resin. If the amount is less than 1.5 parts, an optimum thickening effect cannot be obtained and the resin composition will fail to form satisfactory fillet upon adhering the prepreg to, for example, a honeycomb core. If the amount exceeds 15 parts, the internal stress (strain) increases to reduce adhesive strength.

As compared with silica fine powder alone, the above-mentioned mixture of silica fine powder and aluminum oxide ultrafine powder not only exhibits an excellent thickening effect in an aqueous or polar solvent solution (e.g., water, methanol and ethanol solution) of the water-soluble resol resin, etc. used in the present invention but also shows the effect of providing the solution with thixotropic properties. A suitable mixing ratio of $Al_2O_3$ to $SiO_2$ is from 1/10 to 2/5 by weight.

When the prepreg according to the present invention is adhered as a surfacing material to a honeycomb core to produce a honeycomb-sandwich panel, satisfactory fillet is formed at the portions where the core and the surfacing material meet as shown in FIG. 1, due to the effect of the inorganic filler of increasing adhesive area which thereby insures high adhesive strength. In FIG.

1, 1 indicates a honeycomb, 2 indicates the prepreg of the present invention, and 3 indicates a fillet.

Moreover, addition of the inorganic filler is effective to suppress cure shrinkage of the molded article and to reduce residual internal stress (strain) at the adhesive interface, thereby further enhancing the adhesive strength.

When the inorganic filler treated with an aminosilane coupling agent is used, a crosslinking effect is produced between the inorganic filler-matrix resin ((a)+(b)+(c)) and the adherent (e.g., a honeycomb core)—matrix resin to obtain an excellent adhesion accelerating effect.

Usually the silane coupling agent is reacted with the filler by the following method.

A 20 to 50% coupling agent solution (solvent; water or a mixture of water and alcohol (preferably, 1:9 by weight)) is added gradually to a filler with stirring to form a mixture. After drying the mixture at 100° to 150° C., the mixture is loosened and subjected to use.

The same effect can be obtained by adding a silane coupling agent directly to composition of (a), (b), (c) and (d).

The amount of the silane coupling agent compounded is appropriately decided according to the minimum coverage of the silane coupling agent on the specific area of the inorganic filler. Usually, the amount of the silane coupling agent is set so that the total minimum coverage area of the silane coupling agent is within the range of 1 to 2,000 time the total of the specific surface area of the inorganic filler. Usually, the silan coupling agent is used in an amount of from 0.5 to 7.5 parts by weight per 100 parts by weight of component (a).

Suitable fibrous bases which can be used in the present invention, while not being limited, include glass fiber, carbon fiber, and aramid fiber. The fibrous base may be fiber themselves or, generally, is in a form of woven fabric (including filament cloth and spun yarn cloth), nonwoven fabric, braids, unidirectional filament sheet, etc. The average filament diameter of the fibrous material is preferably from about 1 to 100 μm, more preferably from about 3 to 30 μm.

The prepreg of the present invention can be produced by milling the above-described components of the resin composition in a roll mill to prepare a uniform mixture. Usually component (d) is mixed with component (a) previously. Since commercially available resol phenolic resins are in a state of solution (or dispersion), the mixture is usually in a state of a dispersion. The solids content concentration of the dispersion (which is generally is 50 to 70% by weight) is adjusted to 30 to 85% by weight with a liquid diluent (if necessary) to prepare a resin composition. Preparation of the composition and the impregnation may be conducted at a room temperature.

The preferred diluent is, for example, water or a water-methanol mixture. A suitable methanol to water mixing ratio is from 30/70 to 50/50 by weight. In using such a water-methanol mixture, the drying efficiency in the subsequent drying step is increased to obtain an improved productivity and, in addition, the volatiles content in the resulting prepreg can be minimized so that defects in the final laminate product, such as blisters, layer separation, and warping, can be reduced.

The fibrous base is soaked in the resin solution and squeezed by means of squeeze rollers, etc. so that the fibrous base has a resin pickup of from 20 to 60% more preferably from 30 to 50% and the most preferably from 35 to 45% by weight (based on the total weight of the resin composition and the fibrous base). Then, the fibrous base is dried, usually in a hot air drier, to obtain a phenolic resin prepreg. Drying is conducted preferably at about 100° to 130° C., for about 5 to 15 minutes. Generally, the volatiles content is not more than 6% by weight.

The prepreg of the present invention can be adhered to a material by heat-pressing. The resin composition is usually softened or melted at from 100° to 160° C. and cured. The pressure applied to the prepreg is usually from about 1 to 5 kg/cm$^2$.

The phenolic resin prepregs of the present invention show markedly improved self-adhesion (i.e., they can be adhered to other material without using any adhesive) and lower fuming properties as compared with those prepared by using a phenolic resin alone.

The adhesion property of the prepreg of the present invention to resins such as an aramide resin, an epoxy resin, an unsaturated polyester resin, a phenol resin, nylon, and a polyvinylchloride, metals such as aluminum, steel, stainless steel and titanium and kraft paper (e.g., 60 Lb kraft paper and 125 Lb kraft paper) is remarkably improved. The prepreg of the present invention is especially useful to use as a surface material of a honeycomb panel, especially such a panel made of an aramide resin fiber and impregnated with a phenol resin having heat resistance. The honeycomb sandwich panels produced using the prepreg of the present invention are useful not only as aircraft interior parts which comply with strict fuming regulations but also as structural materials for marine structures, vehicles, and architectural structures.

The prepreg of the present invention can also be used alone to produce molded products.

The present invention is now illustrated in greater detail with reference to Examples, but it should be understood that the present invention is not construed as being limited thereto. All the percents, parts, and ratios are by weight unless otherwise specified.

The performance properties of the final laminate products obtained were evaluated according to the following test methods.

1) Self-Adhesion

Self-adhesion was measured according to drum peel test (MIL-STD-401B).

2) Fuming Property

Fuming property was measured according to the National Bureau of Standard (NBS) system (ASTM-E-662, non-flame test) and was represented by Ds values (specific optical density) calculated from equation:

$$Ds = 132 \log \frac{100}{T}$$

wherein T is the percent light transmission (%) in the NBS chamber.

3) Burning Characteristic

A sample which self-extinguished within 15 seconds from ignition which was started by contacting a flame vertically with the surface of a horizontal sample, which sample did not burn to 6 inches or more from the point of ignition was judged "self-extinguishing".

EXAMPLE 1 AND COMPARATIVE EXAMPLES 1 TO 5

A water-soluble resol phenolic resin "FRL-103" (produced by Showa Highpolymer Co., Ltd.; Mn=about 250), polyacrylamide (molecular weight: 500,000), a bisphenol A epoxy resin emulsion "AQUATOHTO 35201" (produced by TOHTO KASEI CO., LTD.; the chemical formula is the same as shown hereinbefore; epoxy equivalent: 650), an $SiO_2/Al_2O_3$ mixture (5/1 by weight) available as "AEROSIL COK84" (produced by Nippon Aerosil K.K.; the diameter of the $SiO_2$ and $Al_2O_3$ powders were about 12 nm and 20 nm, respectively; $SiO_2/Al_2O_3=5:1$), and an aminosilane coupling agent "A-1100" (produced by Nippon Unicar K.K.; the same as shown hereinbefore) were weighed out at a solid basis for each component of 100:5:5:10:5 and mixed in a three-roll mill to prepare a uniform dispersion. For preparing the dispersion, the inorganic filler was added to a resol phenolic resin aqueous solution to form a dispersion, then the silane coupling agent is added to the dispersion to form a mixture, after then the polyacrylamide and the epoxy resin emulsion is added to the mixture and the mixture was kneaded in the roll mill. The solids content was adjusted to 70% with a 50/50 mixture of methanol and water. The resulting resin solution was impregnated into glass fiber fabric which was in a 8-harness satin weave "KS7781/A-1100" (produced by Kanebo Ltd.) and dried to produce a glass fabric prepreg having a resin content of 40% and a volatile content of 4.0%.

For comparison, a glass fabric prepreg was produced in the same manner as described above except for replacing the resin composition with the phenolic resin alone (Comparative Example 1), a composition comprising the phenolic resin and polyacrylamide at a ratio of 100:5 (Comparative Example 2), a composition comprising the phenolic resin, polyacrylamide, inorganic filler, and silane coupling agent at a ratio of 100:5:10:5 (Comparative Example 3), or a composition comprising the phenolic resin, polyacrylamide, and epoxy resin at a ratio of 100:5:5 (Comparative Example 4).

Each of the resulting prepregs was laminated on both sides of a honeycomb core made of aramid paper "SAHl/8-3.0" (produced by SHOWA AIRCRAFT INDUSTRY CO., LTD.) and molded in a hot press in the air at 130° C. under a pressure of 2.8 kg/cm² for 60 minutes to obtain a honeycomb-sandwich panel.

Self-adhesion (drum peel strength), the NBS system Ds value and the burning characteristics of each resulting panel were measured. The results obtained are shown in Table 1. In this Example the Ds value is preferably not more than 10, and the drum peel strength is preferably not less than 302.4 J/m width (17 Inch.lbs/3 Inch width).

TABLE 1

| Example No. | Impregnating Resin Composition (part) | | | | | Self-Adhesion (Drum Peel Strength) | | Ds Value | Burning Characteristics |
|---|---|---|---|---|---|---|---|---|---|
| | Phenolic Resin (FRL-103) | Poly-acryl-Amide | Epoxy Resin (AQUATOHTO 35201) | Inorganic Filler (AEROSIL COK84) | Aminosilane Coupling Agent (A-1100) | In lbs/3 In width | (J/m) | | |
| Example 1 | 100 | 5 | 5 | 10 | 5 | 22.0 | (391.4) | 4.8 | Self-extinguishing |
| Comparative Example 1 | 100 | (—) | (—) | (—) | — | 5.2 | (92.5) | 2.3 | Self-extinguishing |
| Comparative Example 2 | 100 | 5 | (—) | (—) | — | 6.0 | (106.7) | 2.8 | Self-extinguishing |
| Comparative Example 3 | 100 | 5 | (—) | 10 | — | 9.8 | (174.3) | 3.3 | Self-extinguishing |
| Comparative Example 4 | 100 | 5 | (—) | 10 | 5 | 14.0 | (249.1) | 3.6 | Self-extinguishing |
| Comparative Example 5 | 100 | 5 | 5 | (—) | (—) | 14.5 | (258.0) | 3.8 | Self-extinguishing |

Values in parentheges in Table are those which are outside the scope of the present invention (the same hereinafter).

It can be seen from the results in Table 1 that self-adhesiveness of a phenolic resin can be greatly improved by compounding polyacrylamide, an epoxy resin, and an inorganic filler without having a substantial adverse influence on the Ds value and burning characteristics.

EXAMPLES 2 TO 6 AND COMPARATIVE EXAMPLES 6 AND 7

Using the water soluble resol phenolic resin (FRL-103), the polyacrylamide, the bisphenol A epoxy resin emulsion (AQUATOHTO 35201), the inorganic filler (AEROSIL COK-84), and the aminosilane coupling agent (A-1100) which were used in Example 1, a resin solution was prepared in the same manner as Example 1 except for changing the proportions of AEROSIL COK-84 and A-1100 as shown in Table 2 below.

A prepreg having a resin content of 40% and a volatiles content of 4.0% was produced and then a honeycomb sandwich panel was produced in the same manner as in Example 1, except for using the above impregnating resin solution. Each resulting panel was evaluated in the same manner as in Example 1, and the results obtained are shown in Table 2.

TABLE 2

| Example No. | Impregnating Resin Composition (part) | | | | | Self-Adhesion (Drum Peel Strength) | | Ds Value | Burning Characteristics |
|---|---|---|---|---|---|---|---|---|---|
| | Phenolic Resin (FRL-103) | Poly-acryl-Amide | Epoxy Resin (AQUATOHTO 35201) | Inorganic Filler (AEROSIL COK84) | Aminosilane Coupling Agent (A-1100) | In lbs/3 In width | (J/m) | | |
| Example 2 | 100 | 5 | 5 | 2.5 | 1.3 | 17.0 | (302.4) | 5.7 | Self-extinguishing |

TABLE 2-continued

| Example No. | Impregnating Resin Composition (part) | | | | | Self-Adhesion (Drum Peel Strength) | | Ds Value | Burning Characteristics |
| --- | --- | --- | --- | --- | --- | --- | --- | --- | --- |
| | Phenolic Resin (FRL-103) | Poly-acryl-Amide | Epoxy Resin (AQUATOHTO 35201) | Inorganic Filler (AEROSIL COK84) | Aminosilane Coupling Agent (A-1100) | In lbs/3 In width | (J/m) | | |
| Example 3 | 100 | 5 | 5 | 5.0 | 2.5 | 19.0 | (338.8) | 5.2 | Self-extinguishing |
| Example 4 | 100 | 5 | 5 | 7.5 | 3.6 | 21.7 | (386.0) | 4.7 | Self-extinguishing |
| Example 5 | 100 | 5 | 5 | 12.5 | 6.3 | 21.5 | (382.5) | 4.5 | Self-extinguishing |
| Example 6 | 100 | 5 | 5 | 15.0 | 7.5 | 17.0 | (302.4) | 4.3 | Self-extinguishing |
| Comparative Example 6 | 100 | 5 | 5 | (1.0) | 0.5 | 15.0 | (266.9) | 6.0 | Self-extinguishing |
| Comparative Example 7 | 100 | 5 | 5 | (20.0) | 10.0 | 11.0 | (195.7) | 4.0 | Self-extinguishing |

It can be seen from the results in Table 2 that satisfactory self-adhesiveness (drum peel strength) can be obtained and both a Ds value and burning characteristics in accordance with the objects of the present invention are obtained with the inorganic filler being present within the range of the amount of from 1 to 15 parts per 100 parts by weight of the phenolic resin. If the proportions of the inorganic filler is out of this range, self-adhesiveness tends to be reduced.

EXAMPLES 7 TO 10 AND COMPARATIVE EXAMPLES 8 AND 9

Using the water soluble resol phenolic resin (FRL-103), the polyacrylamide, the bisphenol A epoxy resin emulsion (AQUATOHTO 35201), the inorganic filler (AEROSIL COK-84), and the aminosilane coupling agent (A-1100) which were used in Example 1, a resin solution was prepared in the same manner as Example 1 except for changing the proportion of the polyacrylamide as shown in Table 3 below.

A prepreg having a resin content of 40% and a volatiles content of 4.0% was produced in the same manner as in Example 1 and a honeycomb sandwich panel was produced as in Example 1, except for using the above impregnating resin solution. The resulting panel was evaluated in the same manner as in Example 1, and the results obtained are shown in Table 3.

TABLE 3

| Example No. | Impregnating Resin Composition (part) | | | | | Self-Adhesion (Drum Peel Strength) | | Ds Value | Burning Characteristics |
| --- | --- | --- | --- | --- | --- | --- | --- | --- | --- |
| | Phenolic Resin (FRL-103) | Poly-acryl-Amide | Epoxy Resin (AQUATOHTO 35201) | Inorganic Filler (AEROSIL COK84) | Aminosilane Coupling Agent (A-1100) | In lbs/3 In width | (J/m) | | |
| Example 7 | 100 | 3 | 5 | 10 | 5 | 19.5 | (346.9) | 4.3 | Self-extinguishing |
| Example 8 | 100 | 7.5 | 5 | 10 | 5 | 22.3 | (396.7) | 6.0 | Self-extinguishing |
| Example 9 | 100 | 10 | 5 | 10 | 5 | 22.7 | (403.8) | 7.6 | Self-extinguishing |
| Example 10 | 100 | 15 | 5 | 10 | 5 | 23.0 | (409.2) | 9.8 | Self-extinguishing |
| Comparative Example 8 | 100 | (1) | 5 | 10 | 5 | 13.0 | (231.3) | 4.0 | Self-extinguishing |
| Comparative Example 9 | 100 | (20) | 5 | 10 | 5 | 23.5 | (418.1) | 15.9 | Not Self-extinguishing |

As is apparent from the results in Table 3, as the proportion of the polyacrylamide increases, self-adhesiveness is improved while the Ds value tends to increase and self-extinguishing characteristic disappears.

EXAMPLES 11 TO 14 AND COMPARATIVE EXAMPLES 10 AND 11

Using the water soluble resol phenolic resin (FRL-103), the polyacrylamide, the bisphenol A epoxy resin emulsion (AQUATOHTO 35201), the inorganic filler (AEROSIL COK-84) and the aminosilane coupling agent (A-1100) which were used in Example 1, a resin solution was prepared in the same manner as Example 1 except for changing the proportion of the epoxy resin as shown in Table 4 below.

A prepreg having a resin content of 40% and a volatiles content of 4.0% was produced and then a honeycomb sandwich panel was produced in the same manner as in Example 1, except for using the above impregnating resin solution. Each resulting panel was evaluated in the same manner as in Example 1, and the results obtained are shown in Table 4.

TABLE 4

| Example No. | Impregnating Resin Composition (part) | | | | | Self-Adhesion (Drum Peel Strength) | | Ds Value | Burning Characteristics |
|---|---|---|---|---|---|---|---|---|---|
| | Phenolic Resin (FRL-103) | Poly-acryl-Amide | Epoxy Resin (AQUATOHTO 35201) | Inorganic Filler (AEROSIL COK84) | Aminosilane Coupling Agent (A-1100) | In lbs/3 In width | (J/m) | | |
| Example 11 | 100 | 5 | 2.5 | 10 | 5 | 20.0 | (355.8) | 4.5 | Self-extinguishing |
| Example 12 | 100 | 5 | 10 | 10 | 5 | 23.0 | (409.2) | 5.8 | Self-extinguishing |
| Example 13 | 100 | 5 | 15 | 10 | 5 | 23.3 | (414.5) | 8.6 | Self-extinguishing |
| Example 14 | 100 | 5 | 20 | 10 | 5 | 23.7 | (421.6) | 9.8 | Self-extinguishing |
| Comparative Example 10 | 100 | 5 | (1) | 10 | 5 | 14.8 | (263.3) | 3.9 | Self-extinguishing |
| Comparative Example 11 | 100 | 5 | (30) | 10 | 5 | 24.0 | (427.0) | 23.0 | Not Self-extinguishing |

As is apparent from the results in Table 4, as the proportion of the epoxy resin increases, self-adhesiveness is improved while the Ds value tends to increase and self-extinguishing characteristics disappear.

EXAMPLES 15 TO 17

A honeycomb sandwich panel was produced in the same manner as in Example 1, except for replacing the epoxy resin with each of the epoxy resins (which were also produced by TOHTO KASEI CO., LTD.) shown in Table 5 below. Each resulting panel was evaluated in the same manner as in Example 1, and the results obtained are shown in Table 5.

TABLE 5

| Example No. | Epoxy Resin | Epoxy Equivalent (g/eq) | Self-Adhesiveness (drum) peel strength) | | Ds Value | Burning Characteristics |
|---|---|---|---|---|---|---|
| | | | In lbs/3 In width | (J/m) | | |
| Example 15 | AQUATOHTO 3540 (bisphenol A epoxy resin) | 1800 | 21.5 | (382.5) | 4.6 | Self-extinguishing |
| Example 16 | AQUATOHTO 5003 (phenol novolak epoxy resin) | 205 | 21.3 | (378.9) | 4.5 | Self-extinguishing |
| Example 17 | AQUATOHTO 5520 (urethane-modified epoxy resin) | 540 | 21.8 | (387.8) | 4.9 | Self-extinguishing |

It can be seen from the results in Table 5 that substantially equal effects can be achieved even if the kind of the epoxy resin is altered.

While the invention has been described in detail and with reference to specific examples thereof, it will be apparent to one skilled in the art that various changes and modifications can be made therein without departing from the spirit and scope thereof.

We claim:

1. A low fuming phenolic resin prepreg comprising a fibrous base impregnated with 20 to 60% by weight of a resin composition comprising (a) 100 parts by weight of a resol phenolic resin, (b) from 1.5 to 15 parts by weight of polyacrylamide, (c) from 1.5 to 25 parts by weight of an epoxy resin, and (d) from 1.5 to 15 parts by weight of an inorganic filler, wherein said epoxy resin is water-soluble or capable of forming an emulsion, and wherein said polyacrylamide has a molecular weight of 300,000 or more.

2. A low fuming phenolic resin prepreg as claimed in claim 1, wherein said resol phenolic resin is a water-soluble or water-insoluble organic solvent-soluble and the organic solution thereof is water-dispersible to form an emulsion.

3. A low fuming phenolic resin prepreg as claimed in claim 1, wherein said polyacrylamide is water soluble.

4. A low fuming phenolic resin prepreg as claimed in claim 1, wherein said epoxy resin is a bisphenol A epoxy resin, a phenol novolak epoxy resin or a urethane-modified epoxy resin.

5. A low fuming phenolic resin prepreg as claimed in claim 1, wherein said inorganic filler is a powder of alumina, silica, titanium oxide, silicates, calcium carbonate or metals.

6. A low fuming phenolic resin prepreg as claimed in claim 1, wherein said inorganic filler is a mixture of silica fine powder and aluminum oxide ultrafine powder.

7. A low fuming phenolic resin prepreg as claimed in claim 1, wherein said inorganic filler is a silane coupling agent-treated inorganic filler.

8. A low fuming phenolic resin prepreg as claimed in claim 7, wherein said silane coupling agent is represented by the following formula:

YRSiX3 wherein Y represents an organic group reactive with the matrix resin, R represents an aliphatic hydrocarbon group, and X represents a hydrolyzable group.

9. A low fuming phenolic resin prepreg as claimed in claim 1, wherein said fibrous base is glass fiber, carbon fiber or aramid fiber.

10. A low fuming phenolic resin prepreg as claimed in claim 1, wherein said fibrous base is woven fabric, nonwoven fabric or unidirectional filament sheet.

11. A low fuming phenolic resin prepreg as claimed in claim 1, wherein the amount of the polyacrylamide is from 3 to 10 parts by weight.

12. A low fuming phenolic resin prepreg as claimed in claim 1, wherein the amount of the epoxy resin is from 2 to 20 parts by weight.

13. A low-fuming phenolic resin prepreg as claimed in claim 1, wherein the amount of the inorganic filler is from 2 to 15 parts by weight.

14. A low fuming phenolic resin prepreg as claimed in Claim 1, wherein said inorganic filler has a mean diameter of from 1 to 200 nm.

15. A low-fuming phenolic resin prepreg as claimed in claim 1, wherein the amount of the polyacrylamide is 3.0 to 15.0 parts by weight and the equivalent of the epoxy compound is 650 or more.

16. A process for producing a low-fuming phenolic resin prepreg comprising uniformly mixing (a) 100 parts by weight of a resol phenolic resin, (b) from 1.5 to 15 parts by weight of polyacrylamide, (c) from 1.5 to 25 parts by weight of an epoxy resin, and (d) from 1.5 to 15 parts by weight of an inorganic filler to prepare a dispersion having a solids content of from 30 to 85% by weight in a liquid diluent, and impregnating the resin composition into a fibrous base in an amount of from 20 to 60% by weight of the resin composition, and drying the impregnated fibrous base, wherein said epoxy resin is water-soluble or capable of forming an emulsion, and wherein said polyacrylamide has a molecular weight of 300,000 or more.

17. A process as claimed in claim 16, wherein said diluent is water or a mixture of water and methanol.

18. A process as claimed in claim 16, wherein said inorganic filler has a mean diameter of from 1 to 200 nm.

19. The process of claim 16, wherein said polyacrylamide is water soluble.

20. A process as claimed in claim 16, wherein the amount of the polyacrylamide is 3.0 to 15.0 parts by weight and the equivalent of the epoxy compound is 650 or more.

* * * * *